April 9, 1929.   W. L. PADEN   1,708,189
CASH REGISTER
Filed Sept. 6, 1924   7 Sheets-Sheet 1

Inventor
William L. Paden
By Geo. B. Willcox
Attorney

April 9, 1929.   W. L. PADEN   1,708,189
CASH REGISTER
Filed Sept. 6, 1924   7 Sheets-Sheet 2
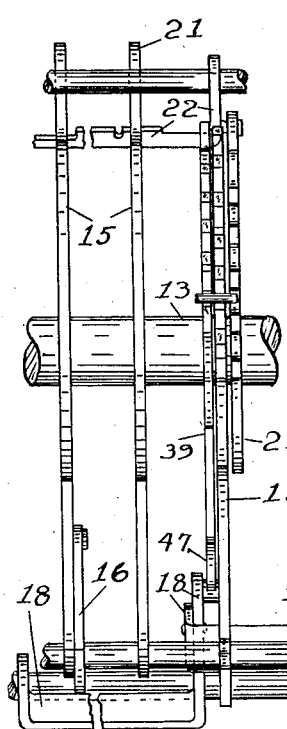
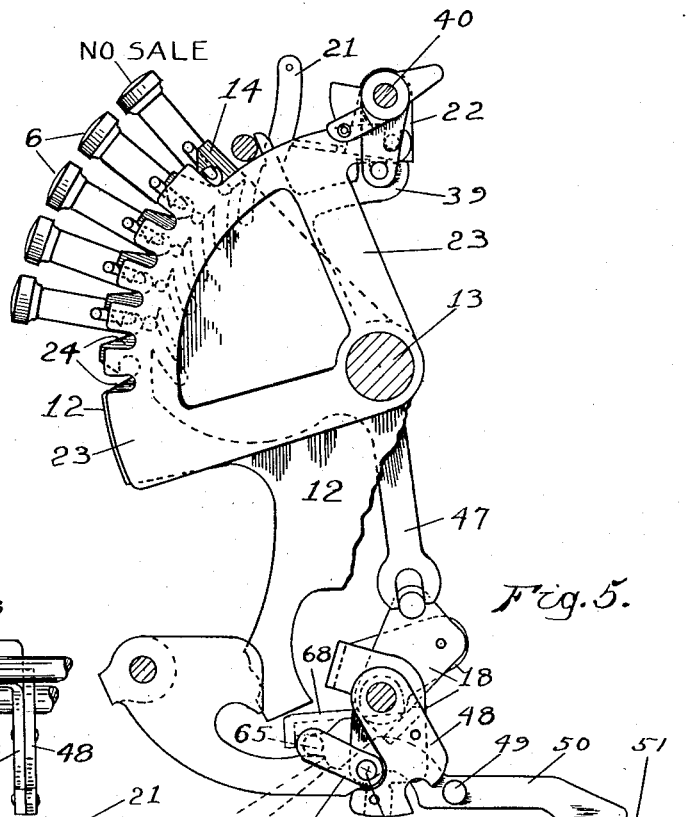
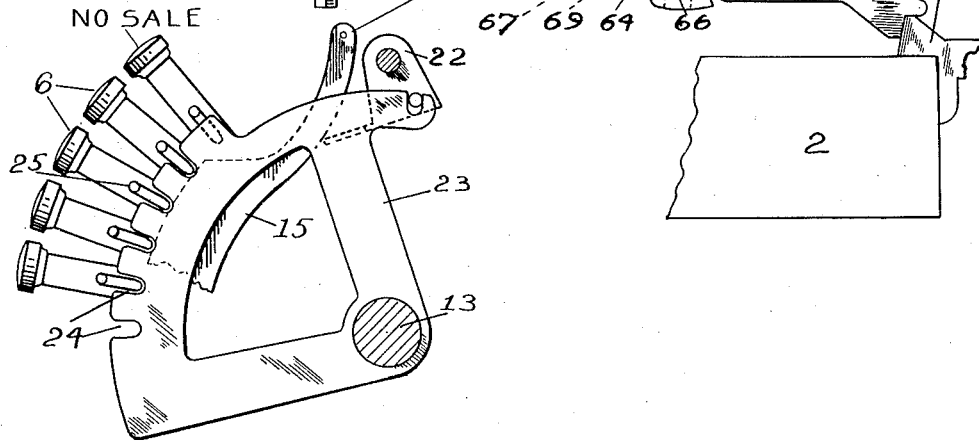

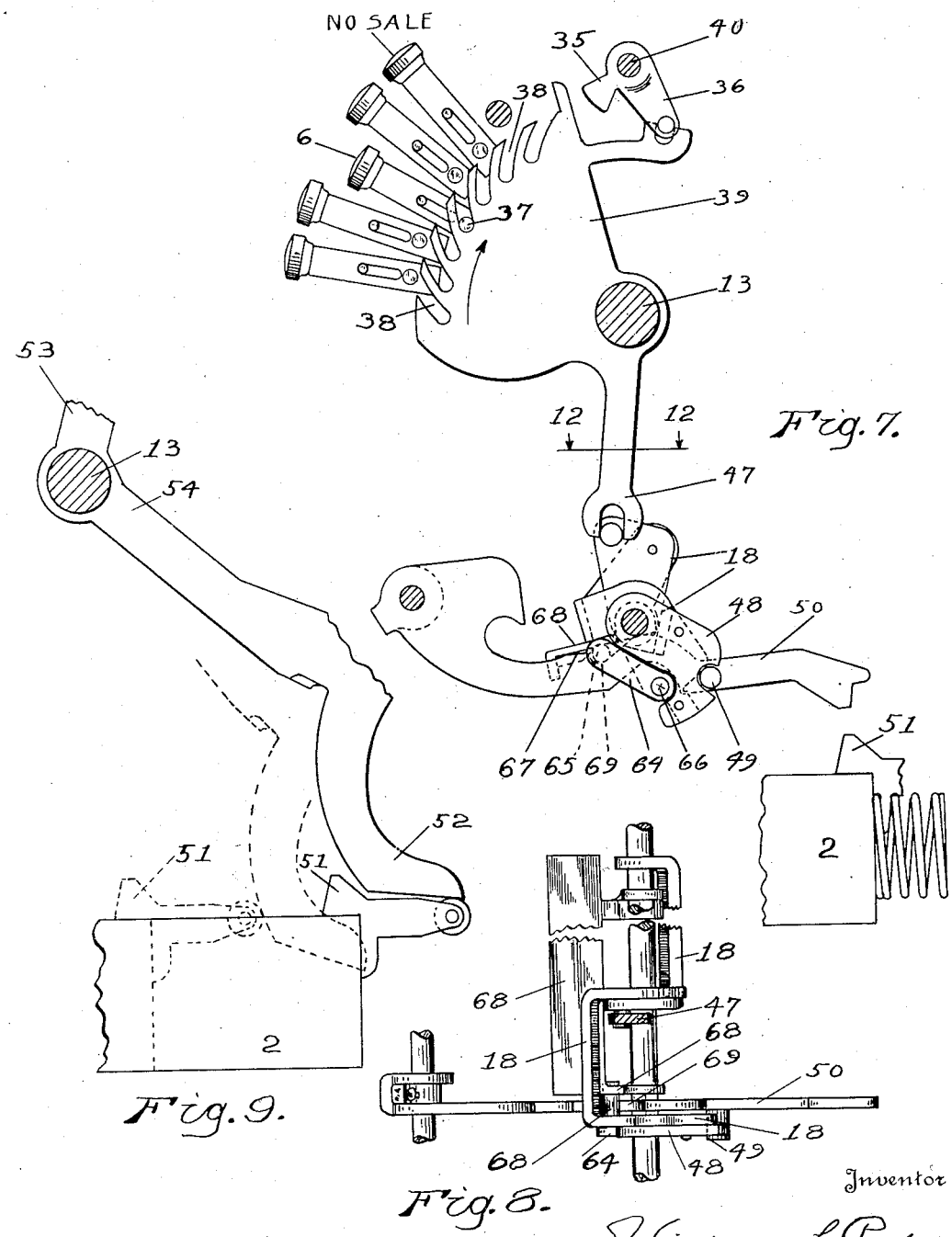

April 9, 1929.  W. L. PADEN  1,708,189
CASH REGISTER
Filed Sept. 6, 1924  7 Sheets-Sheet 4
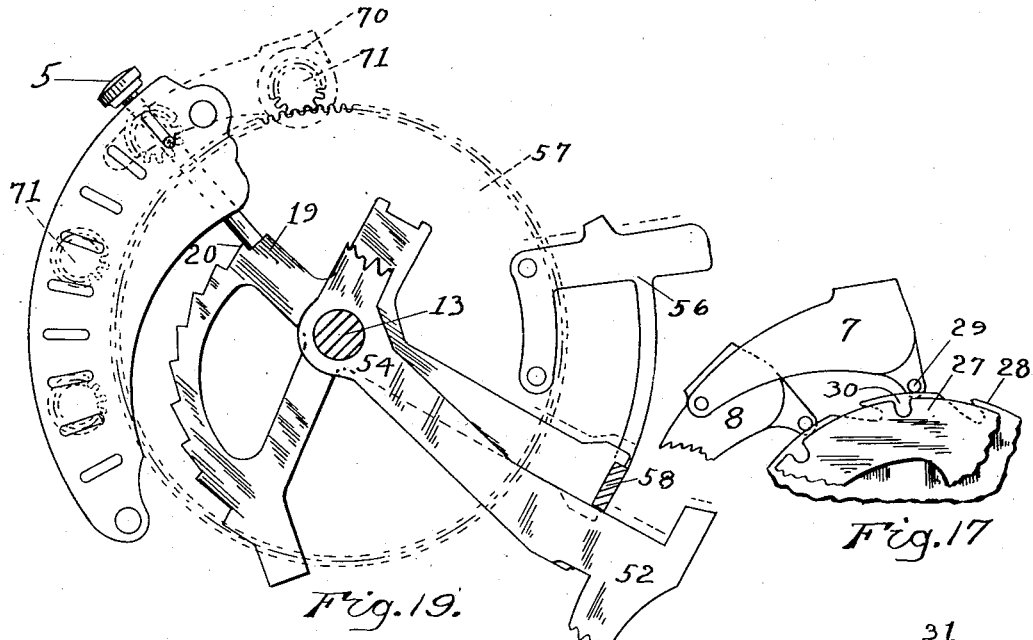
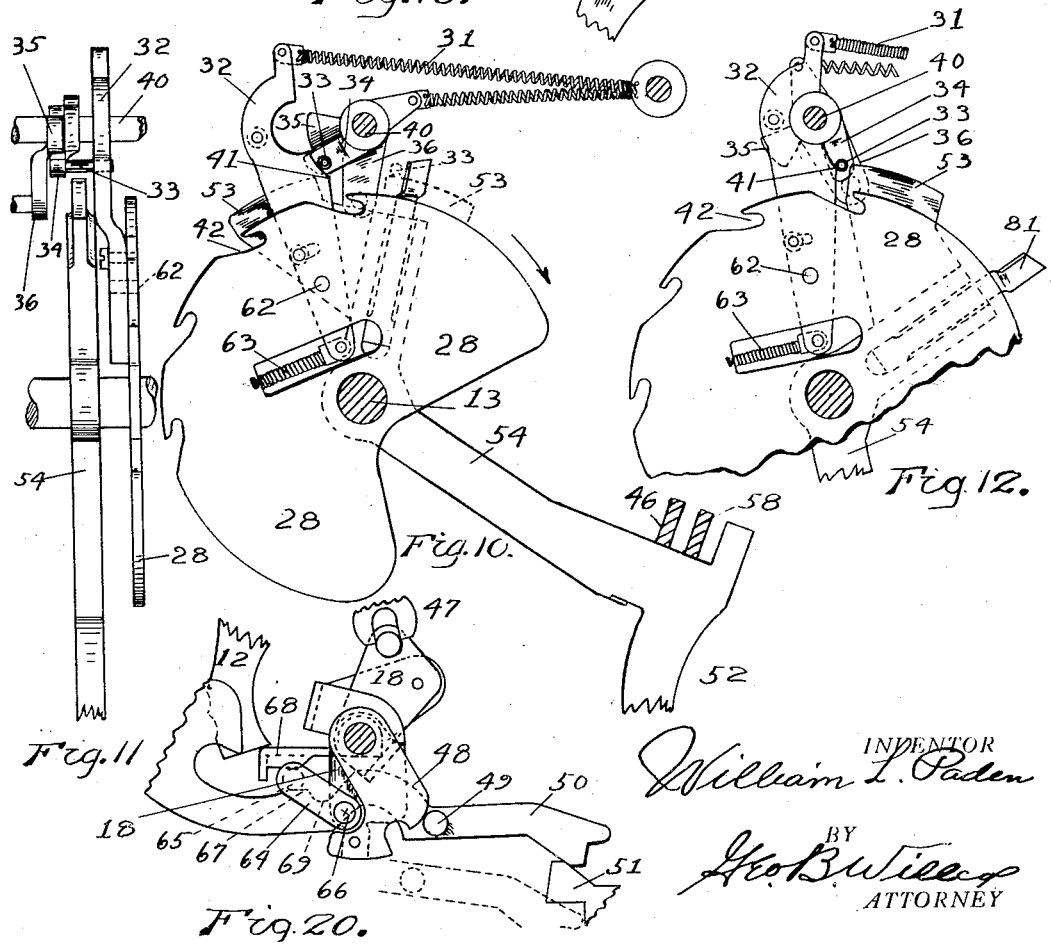

April 9, 1929.　　　W. L. PADEN　　　1,708,189
CASH REGISTER
Filed Sept. 6, 1924　　　7 Sheets-Sheet 5

INVENTOR
William L. Paden
BY
Geo. B. Willcop
ATTORNEY

April 9, 1929. W. L. PADEN 1,708,189
CASH REGISTER
Filed Sept. 6, 1924 7 Sheets-Sheet 6
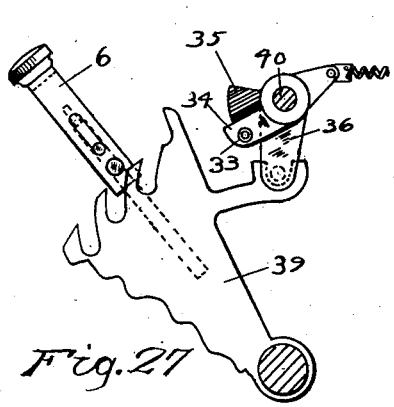
Fig.27
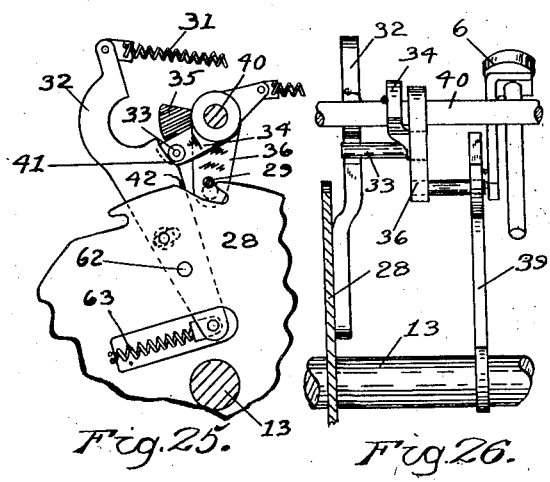
Fig.25. Fig.26.
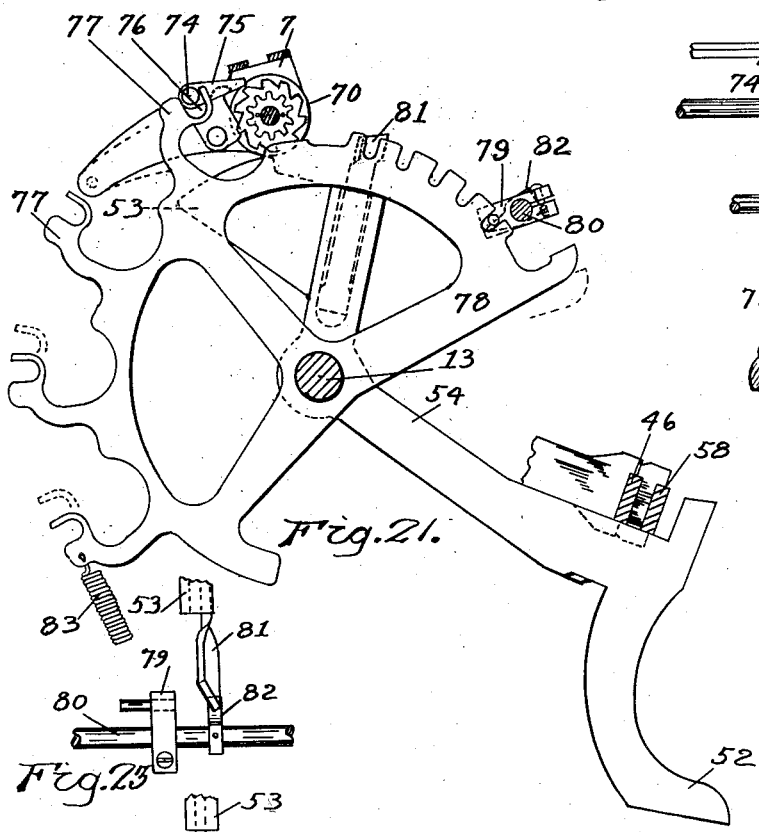
Fig.21. Fig.22.
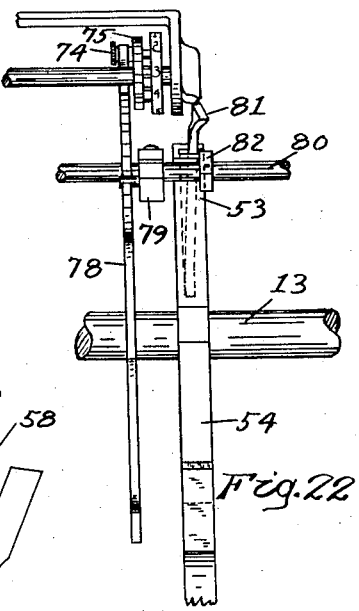
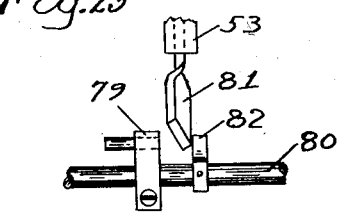
Fig.23
Fig.24
INVENTOR
William L. Paden
BY
Geo B Willcox
ATTORNEY April 9, 1929.   W. L. PADEN   1,708,189
CASH REGISTER
Filed Sept. 6, 1924   7 Sheets-Sheet 7

INVENTOR
William L. Paden
BY
Geo. B. Willcox
ATTORNEY

Patented Apr. 9, 1929.

1,708,189

UNITED STATES PATENT OFFICE.

WILLIAM L. PADEN, OF SAGINAW, MICHIGAN, ASSIGNOR TO EDWIN C. PETERS AND JOHN B. MARTIN, RECEIVERS FOR AMERICAN CASH REGISTER CO., OF SAGINAW, MICHIGAN, A CORPORATION OF DELAWARE.

CASH REGISTER.

Application filed September 6, 1924. Serial No. 736,281.

This machine belongs to that general type of cash registers distinguished by the following principal features:

It is a drawer-operated key-set machine, key board releasing. The mechanism is reset after each operation, principally by gravity, but in some instances aided by spring action, and the counters are automatically set by the key board instead of by lever or other manual operation.

The present improvements have to do more particularly with the arrangement of the departmental counters.

The purposes of my improved counter arrangement are to simplify the construction of the machine as a whole by reducing it to a relatively few groups of standard parts, so that without altering the design, shape or size of the machine frame, or cash drawer, or of the key board, or the customer indicator, the same machine can be easily changed from one of small analyzing and recording capacity to a much greater capacity. For example, it is entirely feasible to take the main parts of my machine, such as the frame, drawer, key board and indicator, and around these parts organize a register suited to a small business with only a few types of operations, or, if desired, a register having capacity for recording a great many varied types of operations.

This is made possible by the novel arrangement of the departmental counters and of the standardized assemblies or groups of mechanism that operatively connect the counters to the key board.

Heretofore it has been customary in multiple-counter cash registers to arrange the counters longitudinally, that is, lengthwise the axis of the machine. Consequently if machines of greater capacity were required, they had to be extended lengthwise. In adapting them to the handling of complicated transactions such extended machines became not only expensive as to construction, but also cumbersome and extremely complicated.

Various other types of machines have been devised to overcome this handicap by mounting the counters in circular or planetary arrangement on a revolving frame or wheel, but machines of this type required the wheel with all its counters to be revolved at each operation of the machine in order to bring the desired departmental counter into action. The inertia of the revolving parts and the relatively heavy mechanisms, that required to be moved considerable distances, necessitated that this labor be performed by means of a handle or other manual devices that not only absorbed considerable power, but also necessitated an additional operation, namely, working the handle, in order to complete the entry.

My improvement avoids the first difficulty above mentioned by arranging the counters in circular form, that is, in a plane at right angles to the axis of the machine, and it avoids the second difficulty by rendering it unnecessary to select the proper counter by revolving the whole system of counters. I provide a simple key-board actuated mechanism that selects the proper counter, and drawer-actuated means that operates the selected counter without planetary movement of any of the counters. By so doing I have made it unnecessary to use a crank or handle or to employ any additional manual work to record the operation.

In my present machine all of the operations, including the selecting of the proper departmental counter and the recording of the transaction, are performed automatically by merely depressing, on the key board, the keys ordinarily required to enter the various elements of the transaction in the register.

For example, in my machine a complete transaction, as understood in present day cash register practice, is accomplished by pressing an initial key to record the clerk's initial, the desired amount keys to show the amount of the transaction and the proper departmental key to show the nature of the transaction, that is, whether cash, credit, etc.

These manipulations on the key-board perform all the necessary functions, including the selecting and operating of the proper counter and the opening of the cash drawer. No crank or other auxiliary mechanism is employed. When the cash drawer is closed the entire cycle of operations has been completed and the machine is again ready to receive the record of another transaction.

With the foregoing and certain other objects in view which will appear later in the specifications, my invention comprises the devices described and claimed and the equivalents thereof.

For purpose of description herein, a cash register embodying my invention will first be described in general with respect to the principal stages of operation, and then, with more particularity the successive stages of its general operation will be briefly designated and analyzed, after which those constructions and modes of operation that have to do particularly with the present invention will be discussed in detail and claimed.

*Stages of operation.*

The complete operation of the machine may be considered as being divided into four principal stages as follows:

First stage, performed by the keys: setting various stop-limit devices that terminate the preliminary or positioning movements to be given to each group of registering mechanism, also throwing previously used counters out of operative engagement.

Second stage, performed by the drawer in its opening movement: imparting to the working parts of the machine the said positioning movements, which, terminated by the previously set stops, thereupon locate the working parts in position to perform their functions.

Third stage; performed by the drawer while being pushed by the operator into its closed position: completing the mechanical functions and registering in accordance with the keys depressed, then re-setting to normal.

Fourth stage; performed by the next opening of the drawer: the transferring on the number wheels, from a number of lower order to a higher number, and the registering of the correct total does not take place during that operation of the counter in which the transaction is recorded, but instead the transfer takes place upon the next opening of the drawer, for any purpose.

*First stage, performed by the keys.*

The first stage above referred to, namely, setting the stop-limits preparatory to positioning the parts, is accomplished as follows:

Depressing an initial key unlocks the drawer-retaining and releasing mechanism so it can later be operated by the departmental key to release the drawer.

After the initial key has been depressed, the "no sale" key can be depressed if the transaction is to be recorded as "no sale". In that event the "no sale" key opens the cash drawer, and locks all of the remaining departmental keys, as well as all of the amount keys.

Depressing the amount keys by interposing suitable travel-limit stops in the paths of certain parts of the adding mechanisms, fixes in the machine the amount to be registered.

Depressing the amount key also locks the "no sale" key in its raised position and unlocks all of the remaining departmental keys.

Depressing any double function departmental key other than the "no sale" key performs simultaneously the following functions:

First, it interposes suitable stop-limit devices and thereby determines which one of the several counters shall receive the amount to be registered during the operation of the cash drawer.

Second, it restores to its inoperative position any counter that may have been operated during a former working of the machine, and temporarily holds all the counters inoperative as to adding, but operative as to transferring.

Third, it releases the drawer, which is thereupon permitted to open, driven outward by spring action.

*Second stage, performed by the drawer in its opening movement.*

The second stage of the machine's operation, consisting in moving the various working parts into position preparatory to performing their operating functions, is accomplished during the outward or opening movement of the drawer in the following manner:

The outwardly moving drawer moves the counter-selective mechanism so as to allow it to position itself according to the stop-limits previously set when the double function departmental key was depressed. So positioned, the selective mechanism is ready to receive the selected counter into operative engagement.

The outward movement of the drawer simultaneously frees the counter-actuating devices so as to allow them to position themselves against the stops that were previously set by the depressing of the amount keys. The counter-actuating devices, when they have so positioned themselves, are ready to add into the selected counter during a subsequent stage of the operation.

The drawer now being fully open, the clerk makes change as usual. During this time the keys remain depressed, all of the various operating mechanisms are in engagement with their previously set stop-limit devices, and to complete the record of the transaction it remains only to actuate the positioned mechanisms as a whole.

*Third stage, performed by the drawer while being pushed into its closed position.*

The final functioning of the machine, in accordance with the operations called for by the keys depressed, is accomplished during the return or closing movement of the drawer when it is pushed shut by the operator. During this third stage, registering, the closing of the drawer accomplishes the following results:

At the first closing movement, the selected counter is thrown into operative engagement with the previously positioned mechanism which is to add the number into the selected counter.

The drawer-releasing part or strap of the double-function departmental key returns to its normal raised position.

A preliminary setting of the key-releasing mechanism takes place so as to bring it into position to release all depressed keys.

The final closing movement of the drawer adds the selected number into the particular selected counter.

When the drawer is nearly closed it releases all of the depressed keys, which return to their raised position.

*Adding into two counters simultaneously.*

In the foregoing general description of the operation of the machine it has been assumed that only one counter is to be used at a time. This machine is, however, capable of adding into one or more of the other counters, say for example, a grand total counter, at every adding operation of the machine, and also into the various selected counters, in the same manner as above indicated.

Having designated and analyzed the successive stages of the operation of the cash register, attention will first be given, in a general way, to the construction of the machine.

Fig. 4 is a front view of the latch plates for the initial, amount and departmental key banks.

Fig. 5 is a side view of the departmental key bank of Fig. 8, together with the drawer releasing and retaining device, the drawer closed and held by the drawer retaining and releasing mechanism.

Fig. 6 is a side view of the departmental key lock-out plate in its operative position with the "no sale" key locked out, the remaining keys unlocked.

Fig. 7 is a side view of the departmental key bank and the drawer-release plate in its operative position, together with the drawer-retaining and releasing mechanism, the departmental key depressed and the drawer released.

Fig. 8 is a top plan view of the drawer retaining and releasing mechanism shown in Fig. 7.

Fig. 9 is a side view showing in full lines the relation of the drawer and the main operating lever, the drawer closed, and showing in dotted lines the same parts with the drawer partly opened.

Fig. 10 is a side view of the counter locking plate and its operating parts in normal or inoperative position, as when the drawer is closed.

Fig. 11 is a front view of the parts shown in Fig. 10.

Fig. 12 is a view similar to Fig. 10, showing the plate and parts in operative position as when the drawer is fully open.

Fig. 17 is a view similar to 16, but shows a counter-cut-out plate in normal position.

Fig. 19 is a side view, showing the means for stop-limiting the adding gears.

Fig. 20 shows the drawer releasing and retaining device with the drawer-latch released and raised as when the drawer is nearly closed at the point where the keys are released.

Fig. 21 is a side view of the transfer plate, showing diagrammatically, a counter operatively connected to the plate by means of the transfer pawl on the counter.

Fig. 22 is a back view of the parts illustrated in Fig. 21.

Fig. 23 is a diagrammatic detail of the rock shaft and its associated parts that oscillate the transfer plate, the parts being shown in position as when the drawer is being opened.

Fig. 24 is a similar view, the parts shown in position when the drawer is being closed.

Fig. 25 is a side view of the device used to prevent blocking the machine in event that the counter fails to properly locate itself in its operative position.

Fig. 26 is a rear view of the parts shown in Fig. 25.

Fig. 27 is a detail of the drawer release plate showing it returned to normal position.

Figure 1:
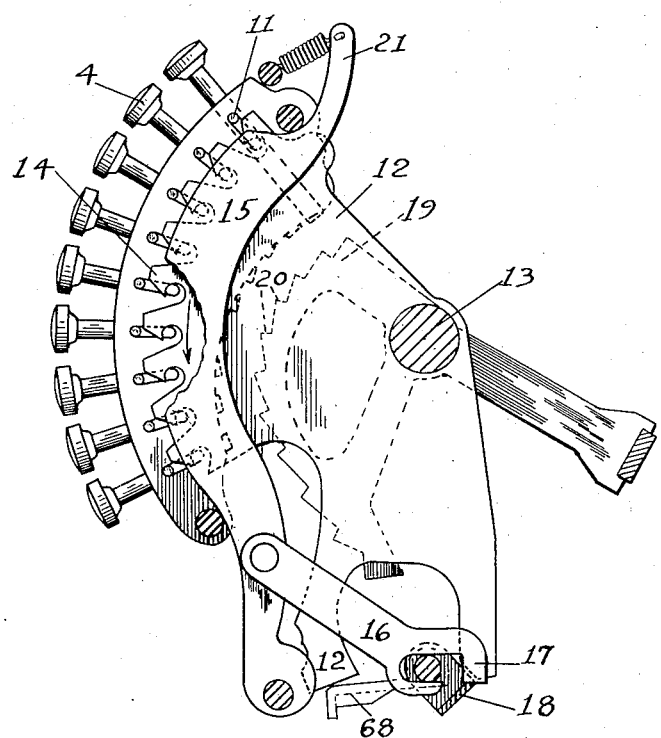
Fig. 1 is a side view, partly broken away, of the bank of initial keys and the latch plate that is shown locking the drawer-releasing and retaining mechanism; and also, at the back, the key detent plate that holds the initial keys in depressed position.

As is clearly shown in the drawings, the register includes the following principal parts: A frame 1, drawer 2, customer's indicator 3, various key banks, such as initial keys 4, numeral or amount keys 5, and departmental keys 6. There is a plurality of independently operated counters or totalizers, as 7, 8, 9, 10, Fig. 2, disposed in a plane at right angles to the main journal, which may be taken to represent the axis of the machine.

In the register, many parts and combinations of devices necessary to the functioning of the machine as a whole, are only incidentally concerned with the subject-matter of my present invention. Such parts and their operation will now be designated briefly before setting forth in detail the devices that embody my invention as claimed.

First stage.

In general, when any key of any of the several banks of keys is depressed it is locked by the following means:

A stud 11, Fig. 1, on the key stem engages a key-detent plate 12 that automatically locks the key in its depressed position. This key detent plate is pivoted on the main journal 13 and is capable of a limited movement of rotation. Its rim is formed with tooth-like projections 14, each beveled on one edge and undercut to form a recess into which the key stud 11 may be received and temporarily locked. Depressing a key causes its stud to engage the beveled edge of the projection 14 and by cam action to slightly rotate the locking plate 12. The stud goes to the bottom of the undercut recess and the key detent plate returns to its former position, as indicated by the arrow, hooking and holding the key depressed.

Unlocking the drawer-retaining and releasing mechanism.

Figure 3:
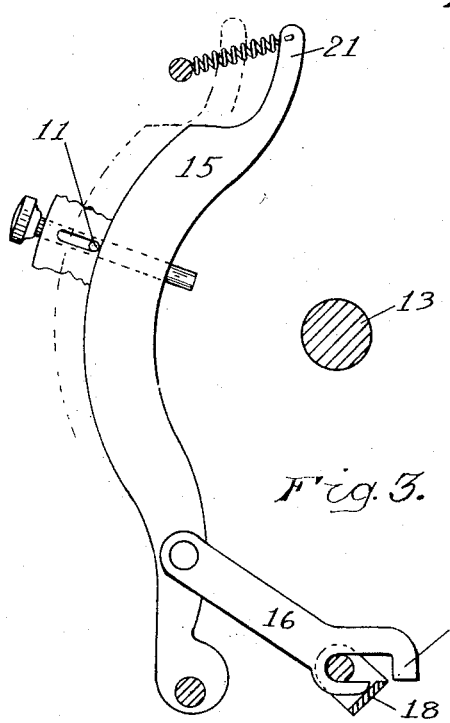
Fig. 3 is a detached view of the latch plate of Fig. 1, in its unlocked position.

In the initial key bank each key 4 has a stud 11 which also engages the outer edge of a latch plate 15, as shown in Fig. 3, when the key is depressed. The stud pushes the latch plate backwardly, and the plate, pivoted at its lower end, rotates slightly.

Near the lower end of the latch plate is pivoted a latch 16, the extremity 17 of which moves away from the circular path of travel of a loosely-suspended yoke 18, see Figs. 1, 2, 3, 8, which is part of the drawer-retaining and releasing device. As is shown in Fig. 12, yoke 18 is in the form of a flat bar bent near its middle and pivotally mounted to revolve about a longitudinal axis so that one part of its length is on one side of the axis and the other part on the opposite side. In practice I prefer to make these two parts separately for convenience in manufacturing, and when the machine is assembled and the final small adjustments are made the two parts are then fastened together and become in effect a single piece (as shown in Fig. 8) of which one part contacts with a key releasing yoke 68, another part engages the downwardly extending arm 37 of a release plate 49, and another part carries a latch-adjusting plate 48. When the machine is in operation all of these attached parts, together with bar 18, comprise a unitary moving piece. The yoke, as in Fig. 3, is no longer blocked, as it was in Fig. 1, but can turn, to thereby release and render operative the device that releases the drawer when a departmental key is depressed.

No sale.

If it be desired to open the drawer without recording a value transaction, the "no sale" key can now be depressed, as shown in Fig. 5.

Figure 2:
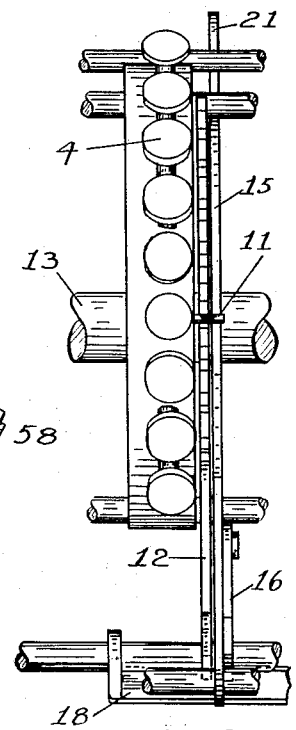
Fig. 2 is a front view of the parts shown in Fig. 1.

Since the initial key banks above referred to are constructed the same as the amount key banks, with the exception of latch 16, which is not used on the amount key bank, Figs. 1, 2 and 3 will also be used in describing the amount key banks.

Stop-limiting the amount to be registered.

An amount key operates as follows: When depressed, the end of its stem constitutes a stop interposed in the path of travel of a rotatable graduated segment 19. The graduated segment is a plate loosely mounted on the main journal 13, as shown in Fig. 1. Its rim is provided with successively arranged stop shoulders 20 so the amount of angular movement permitted the plate is determined by whatever amount-key is depressed. The amount of angular movement determines the travel of the adding gear segments.

*Locking the "no sale" key and unlocking the departmental keys.*

The amount key has a stud similar to 11 and when the key is depressed, the stud, by cam action, rotates a latch plate which is a duplicate of plate 15, Fig. 3, except that it has no latch 16.

Referring now to Fig. 6, when latch plate 15 is actuated its upper end 21 rocks a yoke 22 connected to a departmental key-locking-out plate 23 by stud and slit. This rocking of yoke 22 brings certain slits 24 in the edge of the key-locking-out plate into register with the studs 25 on the stems of all the double function departmental keys 6, except the "no sale" key. That part of the rim of plate 23 which is between two of the slits is thereby brought into register with the stud of the "no sale" key. The "no sale" key is in consequence held inoperative in its raised position. All the other departmental keys 6 are made operative at the same time because slits 24 have been brought into register with the key studs 25 as shown.

*Departmental key selects a counter.*

Figure 14:
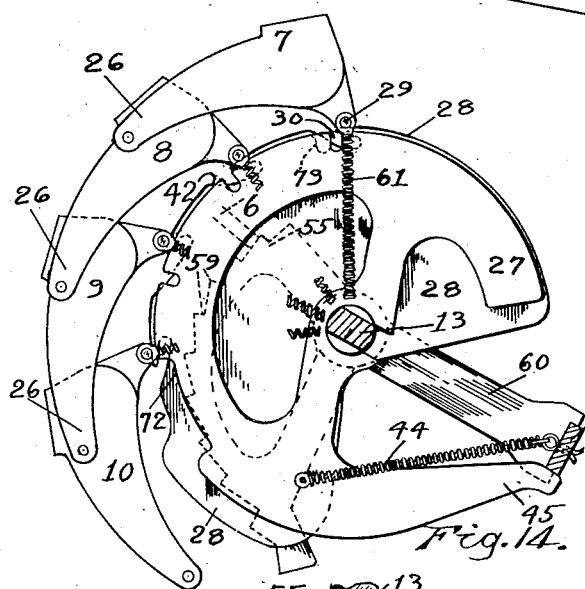
Fig. 14 is a side view of the counter arrangement with relation to the counter-cut-out plate and the counter locking plate, which are here shown in their normal positions.

As previously explained the counters are arranged in a circle, see Fig. 14. Each counter is permitted a limited amount of movement toward and away from the circle. Moved outward, Fig. 16 it is inoperative as to adding, but operative as to transferring. In its in position, Fig. 18, it is operative as to adding, but inoperative as to transferring. As shown in Fig. 14 the counter wheels are mounted on a frame having downwardly extending brackets 26 pivoted at their lower ends to the machine frame. Each counter is controlled, as to its in or out position, by certain departmental keys, that is, one counter may be put in by the "charge" key only and another counter may be put in by the "cash" key and also by the "received on account" key.

Depressing any one such key except the "no sale" key selects the proper counter to receive the next impulse. Briefly, this is done by means of a counter-cut-out and selecting plate 27 which is rotated to a pre-determined position designated by the depressed departmental key, and in that position permits the selected counter to move inward and become engaged in its operative position, and cuts out all other counters.

So far in the description I have briefly set forth how a counter is selected and put into operative engagement. Before continuing the explanation of how it actually operates, it is desirable to show how other counters, that may have been engaged during a previous operation of the register, are disengaged, in order that transferring may take place and the counter cut-out-plate 27 may be shifted to receive the next selected counter.

*Throwing the previously used counters out of engagement.*

The next succeeding operation of the machine may require that a different counter shall receive the registration. Consequently the counter or counters used in a previous working of the register must be thrown out of engagement. Also, transferring must take place among all the number wheels of all the counters that require transferring before those counters can display their respective correct totals, and transferring on any counter requires that the counter may be made inoperative, i. e. thrown out as to adding, but it must remain operative as to transferring. I, therefore, disengage each previously used counter from its adding gear in the following manner, see Fig. 14. The counter locking and ejecting plate 28, when slightly revolved, is adapted to release a counter stud 29' so it can be delivered from a slit 30 in the rim of the counter-cut-out plate 27. The counter locking plate 28, Fig. 10, is retracted in the direction of the arrow by a spring 31 on safety arm 32 which is pivotally mounted on and spring-tensioned to plate 28. The plate 28 is held in its counter-locking position against the tension of spring 31 by a roller 33 on a trigger arm 34. In this position the trigger arm 34 is on dead center.

Figure 15:
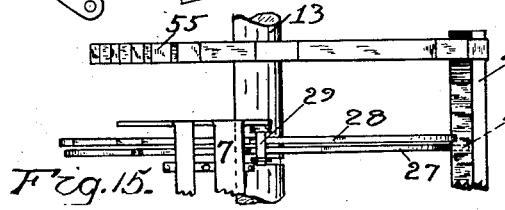
Fig. 15 is a top plan view of the parts shown in Fig. 14.

One arm 35 of a pivotally supported L-lever 36, see also Fig. 7, holds trigger arm 34 on dead center, see Figs. 14 and 15, and it will remain there and keep counter locking-plate 28 in its hooked position with respect to stud 29, see Fig. 22, until the L-lever 36 is rocked.

The object of the trigger arm 34 is to release the counter stud 29 as nearly instantaneously as possible and at exactly the right time in order to get the counter out of gear before the drawer starts to open and transferring commences. These operations are nearly simultaneous because they are both performed by depressing a double-function departmental key 6.

The double function key 6 trips the trigger arm 34 by the following means:

Referring to Fig. 11, when the key 6 is almost fully depressed, its stud 37, engaging the cam-faced slits 38 of release plate 39, partly rotates that plate. There is a pin and slit connection between the plate 39 and one arm of L-lever 36, which is rotatable on a fixed journal 40. When plate 39 rotates, the L-lever rocks, and its other arm 35, which was holding spring tensioned trigger arm 34 on dead center, as in Fig. 10, pushes that arm away from dead center, Fig. 12.

Figure 16:
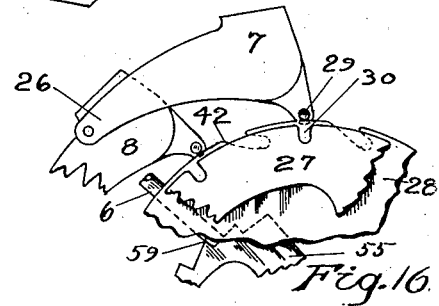
Fig. 16 is a detail showing the counters held in inoperative position by the counter locking plate and shows the counter-cut-out plate positioned to receive the selected counter.

As soon as arm 34 leaves dead center, its roller 33 runs downward and off the end of a cam face 41 of safety arm 32. Arm 32, by action of spring 31, is snapped back, taking the counter locking plate 28 with it. The quick rotation of plate 28, by its cam 42, suddenly ejects stud 29 from slit 30 of counter-cut-out plate 27, as shown in Fig. 16. The counter is thereby thrown out of engagement with its adding mechanism.

When the counter is thrown out, Fig. 14, stud 29 leaves the slit 30 of plate 27. Thereupon, power spring 44 rotates the plate, and the projecting end 45 of that plate is stopped by contact with the under edge of the reach bar 46, leaving plate 27 and its notches out of register with all of the counter studs 29. Consequently all counters are locked out of engagement with their adding gear segments. This lock-out relation of the counter with respect to the counter locking plate and the counter-cut-out plate is shown in Fig. 17.

The foregoing movements, namely, throwing out the counter and returning the cutout plate to its locking out position, both occur before the departmental key is fully depressed. When the key has become fully depressed it releases the drawer, and permits it to open.

*Drawer released and permitted to open.*

Since the opening of the drawer occurs almost simultaneously with throwing previously operated counters out of action, as has been set forth, I will now briefly describe the drawer-opening devices.

Referring again to Fig. 7, the stud 37 on the shank or strap of the departmental key 6, when it was depressed, slightly rotated the drawer release plate 39 in the direction of the arrow. The lower end of the release plate has a downwardly extending arm 47 slitted to engage a stud on the rocking yoke 18 of the drawer-releasing and retaining mechanism.

Fixed to the said yoke 18 is a latch-adjusting plate 48 also slitted at its lower end. The slit straddles a stud 49 on the drawer latch 50 when the yoke 18 is partly rotated. The latch is raised clear of the drawer bracket projection 51, thereby permitting the drawer 2 to open. The drawer is thereupon driven outward by spring action.

*Second stage.*

Having described the means by which the setting of the various stop-limit devices is accomplished, which constitutes what I have termed the first principal stage of operation of the machine, I will now set forth the working of the second stage, namely, moving the working parts against their limit-stops.

*Counter selective mechanism positions itself.*

Figure 13:
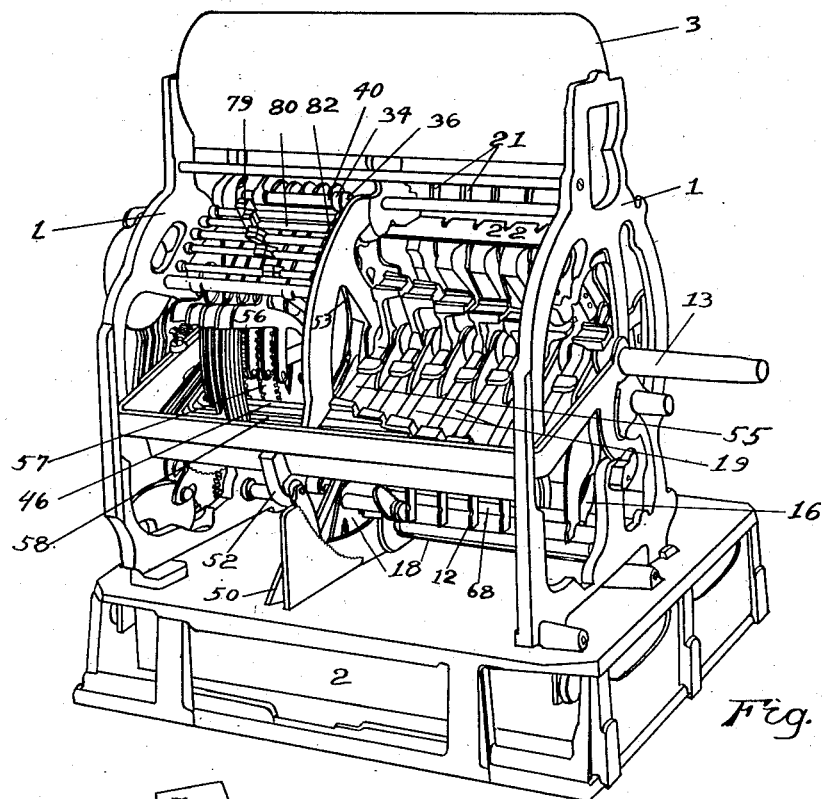
Fig. 13 is a perspective of the back of the register, the casing removed to show the location of the counter-actuating gears and their extensions, also the transfer rock shafts and the general assembly of the other working parts.

Depressing departmental key 6 releases the drawer. The outwardly moving drawer, Fig. 13, is followed by the lower end 52 of the main operating lever, and the upper end 53 of the lever swings in the opposite direction or clockwise. Also, see Fig. 11, bell crank 36 and its arm 35 are thereby rocked counter clockwise. Since the top edge of trigger arm 34, see Figs. 14 and 15, is by means of its spring, normally held in contact with lever arm 35, arm 34 is, therefore, also moved counter clockwise, bringing roller 33, on arm 34, into the path of travel of the upwardly projecting arm 53 on the main operating lever 54. The roller 33, as shown by dotted lines in Fig. 14, then rides upon the rim of arm 53 until that arm reaches the position shown in Fig. 16. In Fig. 16, the roller 33 is shown as having been released from the top of 53, but not yet snapped by its spring back again into its normal position against the arm 35. The parts are now positioned so that the selected counter may be locked to the device that actuates it, as will be described.

Upon the top edge of the lower arm 52 of the main operating lever 54, Fig. 10, rests the reach bar 46 that forms a part of a departmental graduated segment 55, as shown in Figs. 14 and 15. This reach bar 46 is now in position ready to drop with the main operating lever until the attached graduated segment 55 comes to rest against the end of the depressed double function departmental key 6.

Underneath the reach bar 46 is the projecting end 45 of counter cut-out plate 27, which is held against the bar 46 by spring 44.

On the periphery of the counter-cut-out plate 27 are the slits 30 to receive the stud 29 of that counter which was selected by the departmental key. The slits on the periphery of the counter-cut-out plate are suitably spaced to operatively receive that counter which is represented by the key depressed, as shown in Fig. 16.

The counter selective mechanism has now positioned itself with respect to the keys depressed, and the selected counter is ready to be engaged with its several adding gear segments.

*The counter adding mechanisms position themselves.*

Referring to Fig. 19, a rearwardly extending arm 56, forming an integral part of the adding gear segment 57, rests on the top edge of the reach bar 58 of the graduated segment 19, which is controlled by the amount key 5. In Fig. 10 the laterally extending reach bar 58 is shown resting upon the top edge of the lower arm 52 of the main operating lever 54.

The reach-bar follows the main operating lever down until a shoulder 20 of the graduated segment 19, Fig. 19, stops against the end of the depressed amount key 5.

The adding gear segments 57 are now positioned ready to add into the selected counter during a subsequent stage of the operation, which I have designated, "adding the key depressed number into the selected counter."

Third stage.

Having set forth the operations and devices employed to position the stop-limit mechanism and the moving of the parts into position to perform their functions, I will now set forth the means by which the drawer, while being closed, completes the registering according to the keys depressed, and re-sets the parts to normal. This I have previously referred to as the third stage of the machine's operation.

*Selected counter put into operative engagement.*

When the drawer starts to close it swings the lower part of the main operating lever rearwardly and the upper part forward, with the following results:

*The counter cut-out-plate is moved into position to receive the proper counter and no other.*

The counter-cut-out plate 27 is rotated by the gravity drop of reach bar 46, Fig. 14, and its travel is limited by the graduated segment 55, stopped by the stem of the departmental key 6. When rotated to this position, Fig. 16, the counter cut-out plate has one of its rim slits 30 located beneath the stud 29 of the selected counter, but no other of its slits is in register with any other counter. Consequently, only the selected counter can enter the slit. The counter, however, is held out temporarily by counter locking plate 28. The operation is as follows:

Referring to Figs. 14 and 15, counter cut-out plate 27 is rotatable on main journal 13. Its rim has slits 30 spaced with relation to the shoulders 59 on graduated segment 55, each slit corresponding to a shoulder.

The rearwardly extending arm 45 of plate 27 is held against the lower edge of reach bar 46 by spring 44 during such time as the counters are out of engagement.

Reach bar 46 is fixed to the rearwardly extending arm 60 of graduated segment 55. Consequently, when the graduated segment is positioned with one of its shoulders 59 against the stem of departmental key 6, as in Fig. 16, the counter cut-out plate 27 is thereby positioned with one of its slits 30 in register with the counter stud 29 ready to receive the key-selected counter into engagement with its gear segment.

*The selected counter is drawn in and locked.*

Referring to Fig. 12, the front edge of the upwardly projecting arm 53 on the main operating lever comes into contact with the roller 33 on the trigger arm 34 and the roller, forced forward by the main operating lever, runs up the lower end onto the cam face 41, Fig. 10, of the safety arm 32 which is attached to the counter locking plate 28 and pushes the counter locking plate into its normal or locked position.

Figure 18:
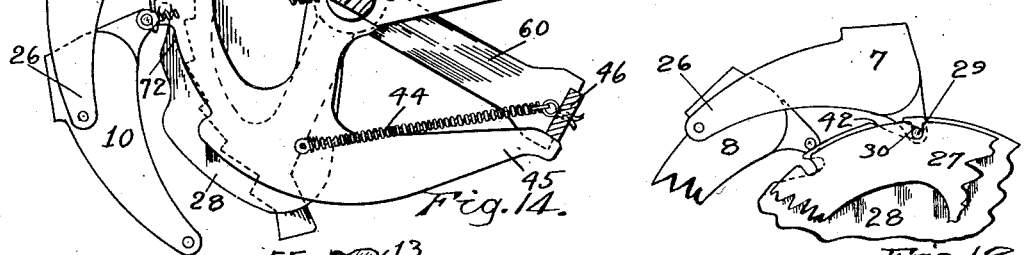
Fig. 18 is a view similar to Fig. 16, except showing one counter locked into operative position, the other counters locked out by the counter locking plate.

The stud on the selected counter, Fig. 18, is, by a spring 61 shown in Fig. 14, made to enter into the cam recess 42 of the counter-locking plate 28 and also into the slit 30 on the periphery of the counter cut-out-plate 27. The counter locking plate 28, during its return to normal position, locks the stud 29 of the selected counter. The counter is thereby securely held in the two registering openings, namely, the cam recess 42 of the counter locking plate and the slit 30 of the counter cut-out-plate. The counter is now in operative engagement with the previously positioned adding gear segment which is to add the number into the selected counter.

*Safety device to prevent damage if counter fails to enter.*

I provide a safety device to prevent blocking the machine in event the stud 29 of any counter as 7, fails to properly engage in the recessed cam 42 of the counter locking plate 28.

Referring to Figs. 25 and 26, the radially disposed safety arm 32 is pivoted intermediate its ends as at 62, to the counter locking plate 28, and is held in normally fixed position thereon by means of a spring 63. If stud 29 of the counter fails to enter the recessed cam 42 and catches on the outer point of the cam, as indicated in Fig. 25, the safety arm 32 will not permit the stud 29 or the counter locking plate 28 to break, but if blocking occurs will yield backward, because roller 33 of the trigger arm 34 strikes the cam face 41 of the safety arm 32, then goes back to its normal position, just as if the obstruction had not occurred. The counter locking plate 28, however, remains blocked by the obstructing stud 29 and the counter does not operate, thereby showing the user that it has failed to connect, and saving the machine from danger of breakage.

The spring tensioned trigger arm 34 returns the L-lever 36 to normal position, as in Fig. 27, bringing with it the drawer release plate 39 and thereby leaving the mechanism in position to be operated again, as though no obstruction had occurred.

*The departmental key strap returns to its raised position.*

Referring to Fig. 10, the first part of the drawer closing movement pushes the lower end 52 of main operating lever 54 back, and its upper end 53 travels forward, wiping against and raising the roller 33 on trigger arm 34. The trigger arm strikes arm 35 of the L-lever 36 and rocks that lever into the position shown. By reason of the pin-and-slit connection, Fig. 7, between arm 36 and the drawer release plate 39, the release plate is slightly rotated and its cam slits 38 eject the stud 37 of the departmental key 6, the strap of which rises to its normal position, as in Fig. 9, although the key stem itself remains depressed, as shown in Fig. 27.

For details of the construction and mode of operation of a double function departmental key such as I have referred to above, and its connected parts, reference may be had to United States patent issued to myself, No. 1,396,277, November 8, 1921.

*Preliminary setting of key releasing mechanism.*

Referring to Figs. 7, 8, 5, 4, and 20, the downwardly projecting arm 47 of release plate 39 has stud-and-slit connection with yoke 18. When arm 47 moves clockwise it moves the upper end of the yoke 18 counter clockwise. Latch-adjusting plate 48 is fixed to the lower end of yoke 18, Fig. 4, consequently its lower end moves counter clockwise into the position shown in Fig. 7, where it is engaged by stud 49 on drawer latch 50, and the latch is in raised position. When the drawer is closed the movements just described are reversed to disengage plate 48 from stud 49 and thereby release the drawer latch.

The drawer latch drops down, as shown by dotted lines in Fig. 24 into the path of travel of the drawer projection 51. During the further closing movement of the drawer, the projection 51 lifts the latch 50 to release the depressed keys.

As shown in Fig. 20, the lifting of drawer latch 50 turns latch-adjusting plate 48, which is fixed to yoke 18, clockwise. The upwardly projecting part of yoke 18 also moves clockwise, carrying with it the downwardly extending arm 47 of release plate 39.

Referring now to Fig. 7, it will be seen that the release plate 39 moves counter clockwise, thereby releasing the stud 37 on key 6 from cam faced slit 38.

A strap link 64, which carries a roller 65, is pivotally mounted, at 66, on the lower end of yoke 18 as shown in Fig. 7. The roller is adapted to be interposed between the projection 67 of the drawer latch 50 and a key releasing yoke 68 when the lower end of drawer releasing yoke 18 is moved forward, as above described.

In Figs. 7 and 8 it will be seen that when yoke 18 with its latch adjusting plate 48 is rotated and raises the latch 50 to release the drawer, roller 65 is drawn from beneath the key releasing yoke 68 and into a depression 69 of drawer latch 50. The roller moves from the position shown in Fig. 9 to that shown in Fig. 7. Hence the depressed keys can not be released at the time the drawer is released. They can be released only when the drawer is near the end of its closing movement. The preliminary setting of the key releasing mechanism has then been accomplished. Later, when the drawer is nearly closed, the depressed keys will be unlocked and released, as will be fully explained in the discussion of that stage of the operation designated: "releasing all the depressed keys."

*Adding the key-depressed number into the selected counter.*

Each number wheel 70, Fig. 19, has a pinion 71 and when the counter is locked in, each pinion is in mesh with an adding gear 57. This gear is in effect a segmental gear, because only a few of its teeth are used to operate the counter wheels. I prefer, however, to employ complete gears, because of simplicity in manufacture and convenience in assembling and adjusting.

Each gear 57 has a partial movement of rotation, forward and back, on main journal 13. In its forward or counter clock-wise movement, namely, its top moving toward the front of the machine, Fig. 19, the gear turns the pinion 71 to add on the counter wheel. The gear receives its rotary movement as follows: The gear segment 57 has the rearwardly extending arm 56, Fig 19, that rests on the top of reach bar 58, which has a movement up and down. Its upward movement is produced by the rearwardly extending arm 52 of the main operating lever 54 during the closing of the drawer by the user. Thus, closing the drawer adds a number into the counter. The correct number is fixed by the amount of angular movement permitted to each of the reach bars 58 as determined by the stop shoulders 20 on the respective graduated segments 19, to which the reach bars are fixed. These shoulders are stopped by the depressed stems of the amount keys 5.

In the foregoing action the counter received its record, but transferring does not take place until the drawer is started on its next opening movement, as will be explained in the description of transferring, which I have called the fourth stage of the register's operation.

Releasing all the depressed keys.

Before the drawer is fully closed, all the depressed keys are released and return to their raised positions.

Referring to Figs. 20 and 8, projection 51 on the drawer raises drawer latch 50 to the position shown by full lines. The raising of the latch lifts roller 65 which engages and raises key-releasing yoke 68. The yoke 68 takes against the lower end of detent plate 12 and rotates that plate, see Fig. 1. The hook-shaped projections 14 of the detent plate thereupon free the studs 11 of all the keys, which return, by spring tension, to their raised positions. Referring again to Fig. 20 when the drawer is fully closed the drawer latch 50 drops in front of the drawer projection 51 and holds the drawer closed. It also permits yoke 68 and plate 12 to return to normal position, shown in Fig. 5.

The machine as adapted for adding into two counters simultaneously.

As has been stated, the machine is capable of adding into more than one counter at a time, say for example, into a "grand total" counter and into another of the selected counters.

Also two or more departmental keys may be arranged to add independently of each other into a single selected counter, as when totalizing cash income, employing the "cash" key and the "received on account" key. In the first instance, namely, one key adding into two counters simultaneously, say, counter 10, Fig. 14 is to be used as a grand total counter. The relation of the counter studs 29 with respect to the slits 30 on the counter cut-out-plate 27 is normally such that only one counter can drop in when a given departmental key is depressed. But by widening a slit, as 72, Fig. 14, so as to enable No. 10 counter to drop in when any departmental key is depressed the 10 counter will also receive the number at the same time any selected counter receives it. Thus by simply removing plate 27, widening a notch, as 72, and replacing the plate in the machine, any combination of key-and-counter operation can be made.

In the second stated case, if it is desired, say, to add "cash" and "received on account" transactions into one counter, say counter 7, the machine can be easily adapted as follows:

Remove counter 8, and widen a slit, as 30, on plate 27, Fig. 14, in the manner shown by dotted lines at 73. The counter 7 will drop into register with its adding gear, when plate 27 is rotated one step, corresponding to the "cash" key; or when rotated two steps, corresponding to the "received on account" key. Formerly it was required to practically take a cash register apart and reconstruct its counter arrangement in order to accomplish the result attained in my machine by the simple means just described.

Fourth stage, transferring.

Having described the mechanisms and their functions employed for registering in accordance with the keys depressed, and having set forth the re-setting to normal, there remains the fourth stage, that is, the means for transferring in the counter from a number of lower to a number of higher order. The transferring operation which takes place at the next succeeding movement of the drawer will now be described.

Referring to Fig. 21, during the slight in-and-out movement of the counter, a stud 74 on the transfer pawl 75, carried by the counter, remains in a curved slit 76 formed in fingers 77 on transfer plate 78. The plate 78 is, therefore, always operatively connected to the transfer pawls 75. Plate 78 slightly rotates when the drawer opens, because it has a slit-and-pin connection to a rocker arm 79 carried by rock-shaft 80. Shaft 80 is rocked in one direction by a trigger arm 81 on the upwardly projecting arm 53 of main operating lever 54, striking a projection 82 on shaft 80, as shown in Fig. 23. This occurs during the rearward movement of the upper end of the main operating lever and the opening movement of the drawer.

Shaft 80 returns to its original position by rocking in the opposite direction when pawl 81 passes beneath the projection 82 on the shaft. This is done by contraction of the spring 83 on transfer plate 78, as shown in Fig. 21.

Referring now to Figs. 22 and 24, the pawl 81 on the upper end 53 of the main operating lever, when returning to its forward position freely passes along one side of the projection 82 on the rock shaft 80 without oscillating the transfer plate 78. On its reverse movement 81 strikes the front face of projection 82, rocking shaft 80 and wiping on past the face of 82. Thus on its first movement it does not operate the shaft 80, but it does so on its reverse movement. The beveled face on the yieldingly mounted trigger arm 81 contacts with the projection 82 on the rock shaft, forcing the arm 81 to yield to one side. This lets the arm return without moving the transfer plate 78.

Figure 28:
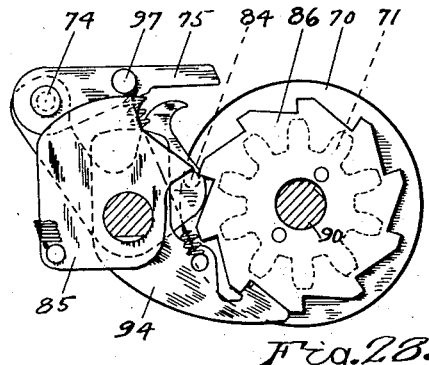
Fig. 28 is a side view of the counter wheels, the transfer tripping plate shown in position while being tripped by a pin on the counter wheel.
Figure 29:
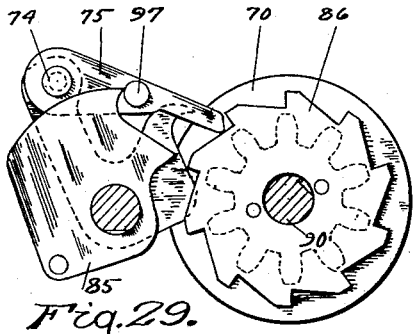
Fig. 29 is a similar view, showing the position of the plate after it has been tripped.
Figure 30:
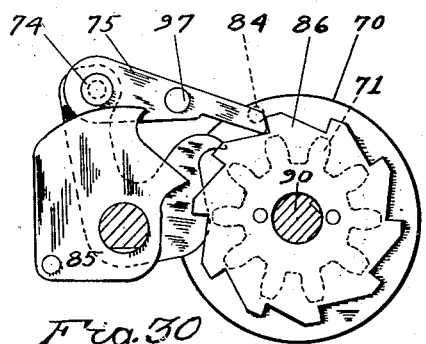
Fig. 30 is a like view showing the counter wheel being rotated and the transfer tripping plate after having returned to normal position.
Figure 31:
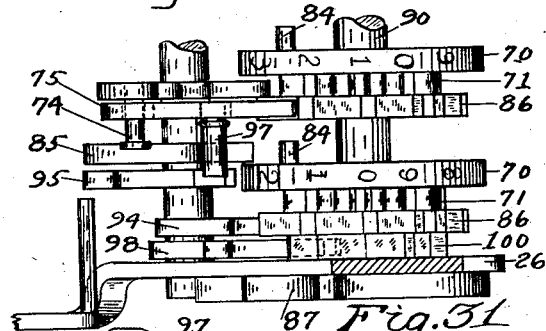
Fig. 31 is a partial top plan view of a counter.

Referring to Fig. 28, on each number wheel 70 of the counter is a laterally projecting stud 84. This stud, at the time when the number wheel of the next lower order registers 9, engages a transfer tripping plate 85, the function of which is to lock, in its normally inoperative or raised position the transfer pawl 75 of the number wheel of the next highest order. When one more number has been added to the 9 of the number wheel of the lower order, and the wheel has been revolved to 0, Fig. 29, the stud 84 trips the transfer tripping plate 85 of the next highest order, standing at 0. The transfer tripping plate then allows the transfer pawl 75 to drop into engagement with a toothed wheel 86 integral with the number wheel. An oscillation of the transfer pawl 75 rotates the number wheel one unit, Fig. 30. The number wheels of the two lower orders thereupon read 1, 0 respectively, completing the transfer operation as positioned in Fig. 31.

Resetting counters.

Figure 32:
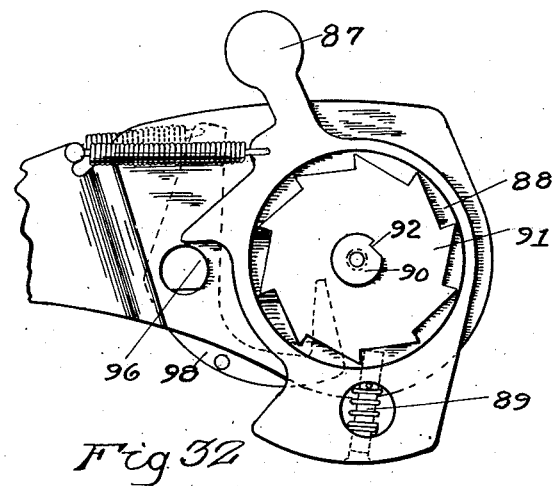
Fig. 32 is a side view of the counter-resetting mechanism.

The resetting of the number wheel to zero is accomplished manually, by means of a hand lever 87, Fig. 32, on the counter, while the counter is out of engagement with its adding gear segments. I have previously described how the selected counter was thrown out of engagement, and now will assume that the counter is out.

Referring to Fig. 32, the hand lever has a central bore 88 and a spring-actuated pawl 89, by which ratchet movement is imparted to the main counter shaft 90, through its ratchet wheel 91.

On the shaft 90 are, loosely mounted, as many number wheels 70 as may be required. On the side of each number wheel is a pinion 71. Fixed to the side of the pinion is the toothed wheel 86.

Figure 34:
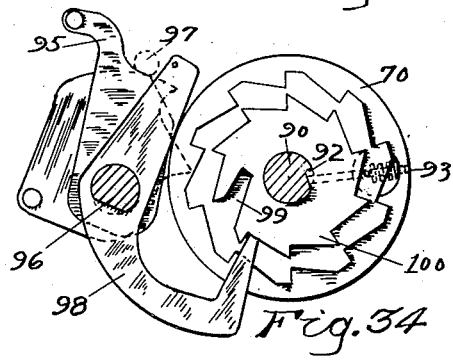
Fig. 34 is a similar view showing the pawls locked out.

The shaft 90, as shown in Fig. 34, has a lengthwise groove 92 to receive a spring-pressed plunger 93, which is mounted radially in each numeral wheel. When the shaft is turned by the hand lever the groove catches the plungers until all the wheels are alined at 0. Spring-tensioned pawls 94, Fig. 28, engage their toothed wheels 86 and hold them in alinement with the numerals, as is usual in counters. While the foregoing resetting operation is occurring, it is necessary to hold all of the transfer pawls 75 out of engagement with their respective toothed wheels 86 so that during the next opening of the drawer, which I have previously described, the number wheels will not be turned to an incorrect reading.

Figure 33:
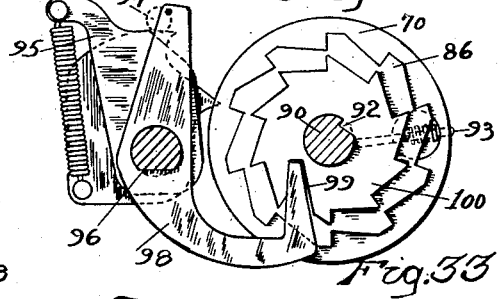
Fig. 33 is a side view of the device for locking out the transfer pawls during resetting.

In an adding operation, the stud 84 on each number wheel 70 trips the transfer tripping plate 85 to permit the transfer pawl 75 to engage its toothed wheel 86. A resetting operation would normally do the same thing. Therefore, I prevent the transfer pawl 75 from dropping during the resetting operation, in the following manner:

The pawl 75 is kept from dropping by a lock-out plate 95, Fig. 33, fixed on a jack shaft 96. When the jack shaft is turned so as to bring the lock-out plate 95 under a pin 97 on the pawl 75, it keeps the pawl in raised position and inoperative, as shown in Fig. 34. Pin 97 is shown diagrammatically by dotted lines in Fig. 34. The jack shaft 96 is turned by an arm 98. The arm is spring-tensioned, and is hook-shaped at its lower end, as shown in Fig. 33, to engage a deep notch 99 in a toothed wheel 100 fixed to shaft 90. When shaft 90 is rotated, the deep notch, by cam action forces hooked arm 98 outward as in Fig. 34, thereby rocking the arm 98 and turning jack shaft 96. Locking-out plate 95 is thereby rocked forward, i. e., to the right in Fig. 34. It thereupon comes underneath the laterally projecting pin 97 on the transfer pawl, to hold the transfer pawl in its raised position during the resetting operation above described.

When the hooked end of arm 98 is in deep notch 99 it prevents shaft 90 from being rotated by the journal friction of the number wheels. When arm 98 is out of engagement with notch 99 and rides on the toothed rim of wheel 100 it prevents backward rotation of shaft 90 which otherwise might be caused by the journal friction of the resetting handle 87 when worked by the user.

Standardized construction.

Throughout the foregoing description I have explained the mode of operation and construction of a cash register embodying my invention, but since cheapness of construction and ready adaptability to conversion from a machine of low registering capacity to one of high capacity depends upon the standardization of the parts and the general design of the machine, I will now refer to that phase of my invention.

The principal features of my improved register from a standpoint of standardization are:

1—Basic frame structure adapted to machines of various capacities;

2—Only one set of devices required for adding and transferring in machines of various capacities.

3—Only one counter cut-out or adding-in mechanism is required for machines of various capacities. Any double function departmental key can engage or disengage any counter, regardless of the number of counters employed.

4—Increasing the counter capacity is done by simply adding one or more unit counter assemblies.

The basic frame structure above referred to is adapted to a machine of any desired capacity, and moreover many different types of machines can be built into this standardized frame by merely adding or deducting duplicate parts and assemblies.

For example, to increase the registering capacity of a plain value-recording machine it is merely necessary to add the following:

a value key-bank assembly, and its locking devices, a graduated segment 19, and actuating devices for adding into the counter, namely, the adding gear segment 57. To add a departmental-key bank to a plain value machine merely requires a double function key bank assembly with its locking devices, a departmental graduated segment assembly 55, and a counter cut-out and selecting plate 27.

Furthermore, to add an initial key bank to a machine which already has a value key bank and a departmental key bank it is only necessary to supply an initial key bank assembly and its locking devices.

Formerly such changes in a cash register required an entire frame structure for each increase in counter capacity. This resulted in making the highest counter capacity machines very bulky. For each increase in counter capacity a new set of working parts was required and these had to be of different lengths and dimensions to reach the different counters. Consequently great numbers of different sized parts had to be kept in stock.

Since in my machine the requirements of the lowest and the highest counter capacity are fulfilled by a single set of actuating devices for adding and transferring, it is only necessary, in order to increase the adding capacity of my machine, to apply the necessary additional value banks, along with the device for actuating the counter device 57, adding gear segment.

In former machines it was necessary to supply for each higher counter capacity a complete additional set of devices for actuating the adding and transferring mechanism.

Since only one counter cut-out and selecting plate 27 is required for a machine of any desired capacity, and since my construction is adaptable to engage or disengage any counter by means of any double function departmental key it follows that I can add into any counter by any departmental key. The only change necessary is cutting slit 30 in counter cut-out and selecting plate 27 to correspond with a given departmental key.

Indeed it is possible to provide a slit 30 nine times the width of the ordinary slit and in that case the extra wide slit will accommodate one counter which will be selected by all of the nine departmental keys. In that case this counter, which may be a grand total counter, will receive all of the amounts put into the register during the day's business.

Heretofore a separate set of counter-cutout mechanism was required for each departmental key in order to accomplish this result, and a different kind of cut-out mechanism was required for each machine of higher counter capacity.

In former machines the counter was cut out by depressing the key, requiring considerable force to be exerted on the key, whereas in my machine the counter is cut out by the operator when he pushes in the drawer, and the key, requiring little power, works easily.

To increase the counter capacity of my machine I merely add the complete counter assembly, but since these assemblies are readily attachable to the frame of a machine it is a small matter to increase the number of counters.

The co-operating mechanism for operating the additional counter is already in the machine.

Heretofore separate counter cut-out and counter actuating mechanisms had to be built into the machine if it was desired to increase the number of counters. In other words it was practically necessary to rebuild the entire machine if it was desired to increase the number of counters, whereas in my present machine the increase can be made with practically no change in the main structural features.

Having thus described my invention, what I claim and desire to secure by Letters Patent is:

In a cash register, counters in circular arrangement, each pivotally mounted on a fixed support and provided with a plate-engaging stud, a counter-cutout plate with its rim formed to provide stud-receiving slits spaced so that only one of the counter studs can be in register with a slit of said plate at a time, a rotatable locking and ejecting plate of slightly larger diameter than the counter-cutout plate, its rim formed with angularly disposed cam recesses spaced to register with said slits, spring actuating means for quickly rotating said ejecting plate, and trigger actuated means for normally holding and for suddenly releasing said ejecting plate.

In testimony whereof, I affix my signature.

WILLIAM L. PADEN.